United States Patent [19]

Gogniat et al.

[11] Patent Number: 4,589,886

[45] **Date of Patent: * May 20, 1986**

[54] METHOD OF MAKING PART OF A WATCH CASE

[75] Inventors: Paul Gogniat; Eric Loth, both of Bienne, Switzerland

[73] Assignee: Montres Rado S.A., Longeau, Switzerland

[ * ] Notice: The portion of the term of this patent subsequent to Feb. 28, 2001 has been disclaimed.

[21] Appl. No.: 557,917

[22] Filed: Dec. 5, 1983

[30] Foreign Application Priority Data

Dec. 14, 1982 [CH] Switzerland ........................ 7262/82

[51] Int. Cl.[4] ............................................ B23P 13/00

[52] U.S. Cl. ...................................... 29/179; 29/807; 368/296

[58] Field of Search .................. 29/179, 807; 65/60.2, 65/60.4, 59.3; 264/135; 368/294, 296

[56] References Cited

U.S. PATENT DOCUMENTS 2,468,239 4/1949 Saulino ............................... 264/135
2,597,935 5/1952 Kiehl .................................. 368/294
2,854,815 10/1958 Piquerez ............................. 368/296
4,293,942 10/1981 Baumgartner ........................ 29/179
4,433,921 2/1984 Gogniat et al. ..................... 368/294

FOREIGN PATENT DOCUMENTS 2034617 11/1970 France .
2051627 10/1971 France .............................. 368/296
96267 8/1981 Japan .................................. 368/296
13597/73 7/1976 Switzerland .

*Primary Examiner*—Howard N. Goldberg
*Assistant Examiner*—P. W. Echols
*Attorney, Agent, or Firm*—Spensley Horn Jubas & Lubitz

[57] ABSTRACT

In the manufacture of a watch case part comprising a glass and a middle having an opening for the glass, the following operations are carried out: first, a metallic coating is deposited on a peripheral portion of the glass, then one or more elements are formed on the coating by moulding a molten material having an affinity for the metal forming the coating, whereupon the glass is secured to the middle through the intermediary of the fastening element. The fastening element may consist of a heel extending around the periphery of the glass or of fastening studs extending at right angles to the plane of the glass. In some cases the fastening element may also act as sealing element.

8 Claims, 9 Drawing Figures

METHOD OF MAKING PART OF A WATCH CASE

BACKGROUND OF THE INVENTION

This invention provides a method of making part of a watch case.

It is known to provide a glass with annular heel-like fastening means such that will enable the glass to be removably mounted in a watch case bezel or middle. In such cases, the annular heel-like fastening means are produced separately and the glasses and the fastening means are then assembled, e.g. by thermocompression or glueing. However, besides the additional cost brought on by the initially separate heel, this method greatly restricts the choice of material that can be used for the heel. As a rule, the heel must be made of a material having properties very similar to those of the glass, which may be made of glass or sapphire, thus making the machining of the heel and of possible anchoring means such as threaded holes rather tricky. Further, the firmness of assemblies thus produced and their fluid-tightness are, in the long term, not perfect.

SUMMARY OF THE INVENTION

An object of the invention is to provide in a ready manner a watch glass with fastening means made from various materials, in particular, when required, from materials that are easily worked, in whatever shape.

BRIEF DESCRIPTION OF THE DRAWINGS

In the accompanying diagrammatic drawings given by way of example.

DETAILED DESCRIPTION

Figure 1:
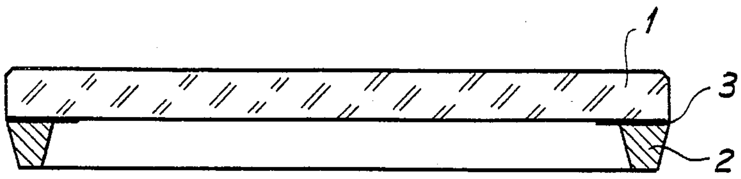
FIGS. 1 to 7 show various watch glasses according to the invention.

The watch glass, 1, shown in FIG. 1 comprises fastening means 2. In the region of contact between the glass 1 and the fastening means 2 a metallic coating 3 is deposited on the peripheral portion of the glass. The coating 3 serves to mask the fastening means 2 and to provide an assembly of greater firmness. The glass 1 may have any required shape and the fastening means 2, here in the form of an annular heel, may have a corresponding shape. This heel may extend not over the entire periphery of the glass but only, for example, along a pair of opposite sides of a rectangular, e.g. square, glass.

Figure 2:
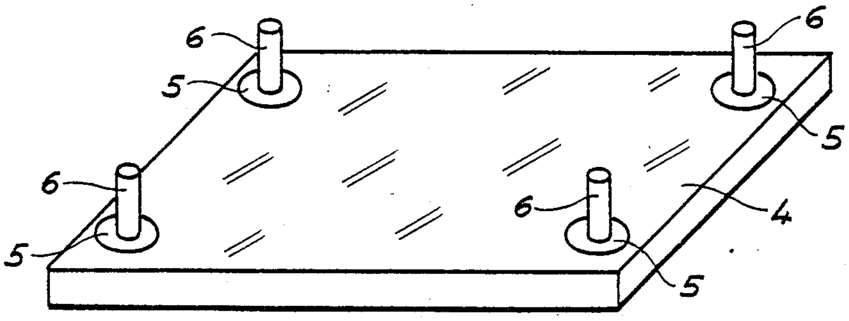

In FIG. 2 there is shown a flat glass 4 on which have been deposited metallic coating areas 5. At the centre of these areas 5 are secured fastening studs 6 extending at right angles to the plane of the glass and forming fastening means.

The fastening means 2 and 6 are not made separately and then mounted on the glass in an often unsatisfactory manner, as has been done in the prior art, but are formed directly on the respective metallic coatings by moulding on a molten material. Subject to the material for the fastening means being compatible with the metallic coating material and having a good affinity therefor, the range of materials that can be used for the fastening means is extensive and includes most of the metal alloys commonly used in the watch making art or in precision engineering.

For example, the fastening means may be made of a metal such as zinc, tin, copper or gold, in a pure or alloyed state, In particular, use may be made of a metal known as zamac, which is an alloy of zinc, aluminium, magnesium and copper. Euctectic alloys are particularly suitable inasmuch as the euctectic composition of an alloy leads to a lower melting temperature.

The coatings applied at the junction between the fastening means and the glasses may be deposited by various known methods such as vacuum metallization or electrolytic depositing. Such coatings may involve several layers, e.g. a first layer of chromium to provide good adherence to the glass and to mask the fastening means, over which is deposited a second layer of a material similar to that used for the fastening means to ensure proper bonding of the metal during moulding. For instance, an outer layer of zinc may be used for bonding zamac fastening means or of gold for bonding gold fastening means.

Because the state of the surfaces of the fastening means when they come out of the mould is very good, it may not be necessary subsequently to machine these surfaces.

Figure 3:
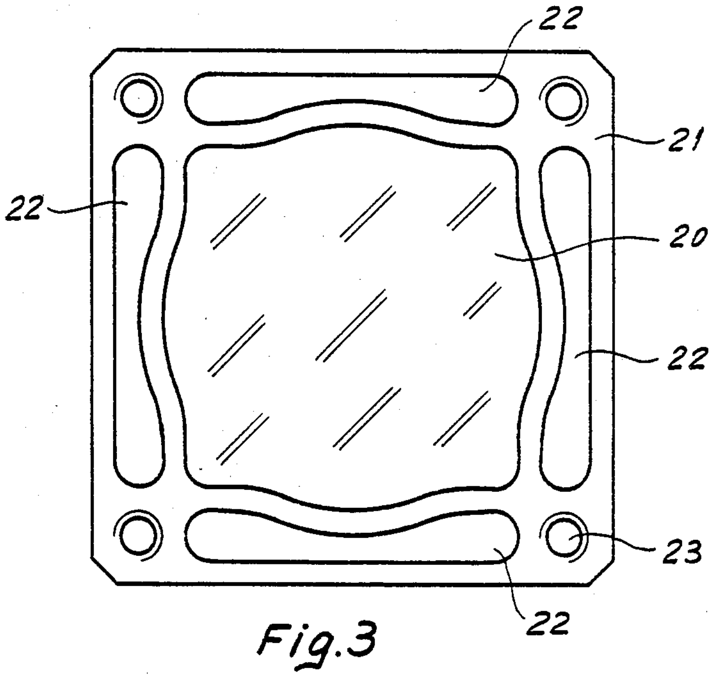
Figure 4:
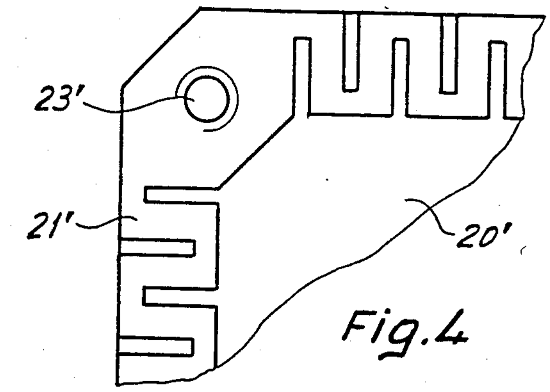

FIGS. 3 and 4 are underneath plan views of flat watch glasses 20 and 20' provided with peripheral heels 21 and 21' each having a width that varies to render it slightly deformable in a plane parallel to the plane of the glass, for instance to absorb the strains that occur during cooling of the heel-forming material, or those due to the difference in the coefficients of expansion of the glass and the heel. This varying width may be achieved by narrowing the general shape of the heel or by providing openings 22 (FIG. 3), or indentations 22' (FIG. 4) formed alternately along opposite edges of the heel during moulding. Tapped holes 23 and 23' enable the fastening means provided by the heels 21 and 21' to be secured to the middle of a watch case.

Figure 5:
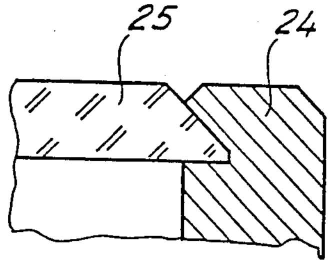

In FIG. 5, fastening means 24 extend beyond oblique edges of a flat watch glass 25 over at least part of its circumference. Further, the fastening means 24 extend upwardly over part of the height of the glass edges such as to entrap them upon solidification of the material used for the fastening means and its accompanying shrinkage. By appropriately sizing the glass 25 and the fastening means, the latter can thus be made to grip the glass by a wedging action and to form a fluid-tight seal therewith.

Figure 6:
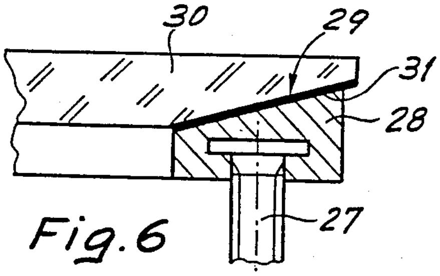

In FIG. 6, inserts 27, consisting of threaded steel studs, are partly embedded in fastening means 28 during moulding of the latter to enable the fastening means to be anchored in another part of the watch case. As will be observed, the fastening means 28 may be formed on an inclined portion 29 of the underside of an otherwise flat watch glass 30 after application of a coating 31.

Figure 7:
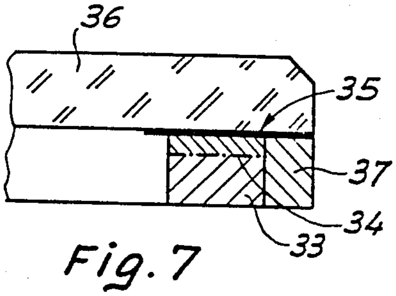

In FIG. 7, the fastening means, 33, include two adjacent portions, separated by a chain-dotted line 34, made up of different materials. For instance, the portion adjacent coating 35 on glass 36 may consist of a layer of tin to ensure good bonding with the coating 35 and the portion beneath this layer may consist of a bronze having better mechanical properties. Both portions being formed in a molten state, the line 34 should be thought of not as a sharp division between the two portions but rather as a region of interpenetration of the two materials. In addition, the fastening means 33 are surrounded by a rim 37 which may be of a hard material or a precious metal such as gold. This rim, which may thus have a protective or decorative function, can, for instance, be fitted on the fastening means 33 after the latter have been formed, or be disposed inside the mould used in forming the fastening means.

Figure 8:
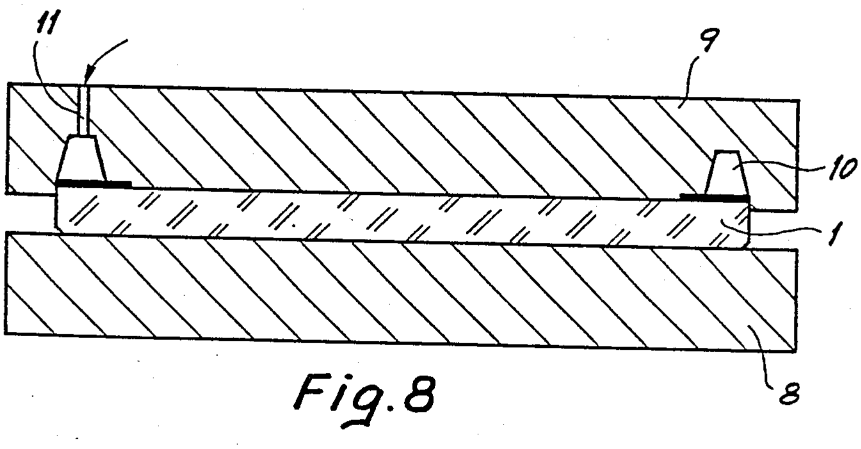
FIG. 8 is a sectional view of one form of apparatus used in carrying out the method according to the invention.

The apparatus shown in FIG. 8 is used to produce the arrangement of FIG. 1. The glass 1 is placed between two plates 8 and 9 of an injection moulding machine. The plate 9 has a channel 10 shaped to correspond to the heel-like fastening means having to be formed. Molten material is injected into channel 10 through an opening 11. The glass 1 may be heated inside the moulding machine and any known method for moulding molten material may be resorted to, e.g. centrifugal moulding, or moulding in a furnace kept at a low pressure to lower the melting point of the materials used.

Although metallic materials are preferably used in the production of the herein described and illustrated fastening means, organic materials, e.g. synthetic plastics, may also be used, particularly when the fastening means are protected by a surrounding rim as described with reference to FIG. 7.

Figure 9:
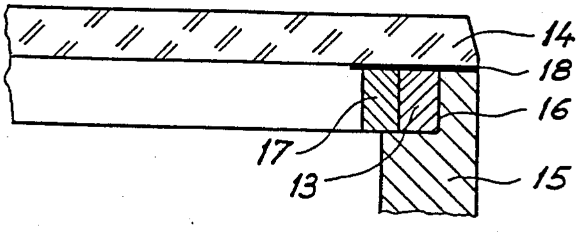
FIG. 9 is a cross-sectional view of a watch case part fitted with a further watch glass, in accordance with the invention.

In FIG. 9, annular fastening means 13 made as indicated above are used, not only for securing a glass 14 to the top of a watch case part 15, e.g. a middle or a bezel, but also to render the assembly fluidtight. To this end, the fastening means 13, which is made of a material able closely to adapt to the periphery of a recess 16 provided in the part 15, is force fitted into the recess. The engagement of the fastening means 13 with the circumferential surface of the recess 16 may be further improved by a tensioning ring 17 applied to the inside of the annular fastening means. When an inner tensioning ring is provided, the metallization 18 applied to the underside of the glass 14 extends inwardly beyond the tensioning ring to mask both the fastening means and the tensioning ring.

We claim:

1. A method of providing a substantially flat glass for a watch case with means for fastening said glass to another part of the watch case, which comprises the steps of:

(a) depositing a metal coating on at least one peripheral portion of the glass; and (b) moulding on the coating a molten metal material having an affinity for the metal of the coating to form said fastening means.

2. A method as in claim 1, in which the fastening means are formed to provide a peripheral heel on one surface of the glass.

3. A method as in claim 1, in which the fastening means are formed to provide a plurality of studs at right angles to the plane of the glass.

4. A method as in claim 2, in which the heel is formed with a varying width to allow slight deformation in a plane parallel to the plane of the glass.

5. A method as in claim 1, in which the fastening means are formed with anchoring inserts.

6. A method as in claim 5, in which the inserts are threaded studs.

7. A method of fastening a glass of a watch case to another part of the watch case and having an opening, which comprises the steps of:

(a) depositing an endless metal coating adjacent the periphery of the glass;

(b) moulding on the coating a molten material having an affinity for the metal of the coating to form endless heel-like fastening means;

(c) providing in said other watch case part adjacent said opening an endless recess adapted to receive the heel-like fastening means with a force fit such as to ensure fluidtightness between the glass and said part; and (d) force fitting said heel-like fastening means in said recess.

8. A method as in claim 7, in which said heel-like fastening means and said recess are annular and said heel-like fastening means are pressed into engagement with a peripheral wall of said recess by a tensioning ring applied against the inside of said heel-like fastening means.

* * * * *